(12) United States Patent  
Bouaoua

(10) Patent No.: US 12,072,317 B2  
(45) Date of Patent: Aug. 27, 2024

(54) WALL THICKNESS DETECTION OF A MATERIAL LAYER USING ULTRASOUND

(71) Applicant: ROSEN SWISS AG, Stans (CH)

(72) Inventor: Nourreddine Bouaoua, Karlsruhe (DE)

(73) Assignee: ROSEN SWISS AG, Stans (CH)

( * ) Notice: Subject to any disclaimer, the term of this patent is extended or adjusted under 35 U.S.C. 154(b) by 247 days.

(21) Appl. No.: 17/790,118

(22) PCT Filed: Jan. 6, 2021

(86) PCT No.: PCT/EP2021/050130  
§ 371 (c)(1),  
(2) Date: Jun. 29, 2022

(87) PCT Pub. No.: WO2021/140120  
PCT Pub. Date: Jul. 15, 2021

(65) Prior Publication Data  
US 2023/0042853 A1 Feb. 9, 2023

(30) Foreign Application Priority Data  
Jan. 6, 2020 (BE) .................................. 2020/5004

(51) Int. Cl.  
*G01N 29/07* (2006.01)  
*G01N 29/44* (2006.01)

(52) U.S. Cl.  
CPC ......... *G01N 29/07* (2013.01); *G01N 29/4454* (2013.01)

(58) Field of Classification Search  
CPC .... G01N 29/07; G01N 29/4454; G01N 29/11; G01N 29/348; G01N 29/46; G01N 29/043; G01N 2291/2634; G01N 2291/101; G01N 2291/102; G01N 2291/106; G01N 2291/044  
(Continued)

(56) References Cited

U.S. PATENT DOCUMENTS 4,285,053 A 8/1981 Kren et al.  
4,512,194 A 4/1985 Beuter  
(Continued)

FOREIGN PATENT DOCUMENTS

DE 11 2012 000 663 B4 8/2012  
EP 1 333 277 A2 8/2003  
(Continued)

*Primary Examiner* — Jacques M Saint Surin  
(74) *Attorney, Agent, or Firm* — Patent Technologies, LLC; Robert D. Gunderman, Jr.

(57) ABSTRACT

The invention relates to an acoustic sensor system (1) for detecting the wall thickness (WT1, WT2) of a material layer (2) of a pipeline wall (3), having at least one transmitter unit (4), which is configured to emit ultrasound in the direction of a material layer (2) and detect an ultrasound echo reflected by the material layer (2), and a control unit (5), which is connected to the at least one transmitter unit (4) for signaling purposes and is configured to detect the wall thickness (WT1, WT2) of the material layer (2) using the ultrasound echo. The invention additionally relates to an in-line inspection device comprising the sensor system (1), to a method for detecting the wall thickness (WT1, WT2) of a material layer (2) of a pipeline wall (3), to a computer program, to a data carrier signal, and to a data storage unit.

9 Claims, 2 Drawing Sheets

(58) Field of Classification Search
USPC .......................................................... 73/597
See application file for complete search history.

(56) References Cited

U.S. PATENT DOCUMENTS

| | | | | |
|---|---|---|---|---|
| 6,848,313 | B2* | 2/2005 | Krieg | G01N 29/2456 |
| | | | | 73/624 |
| 7,415,880 | B2* | 8/2008 | Renzel | G01N 29/4472 |
| | | | | 73/627 |
| 7,514,918 | B2* | 4/2009 | Crouzen | G01B 7/10 |
| | | | | 324/225 |
| 10,436,667 | B2* | 10/2019 | Littlestar | G01M 3/243 |
| 2023/0049260 | A1* | 2/2023 | Bouaoua | G01N 29/07 |

FOREIGN PATENT DOCUMENTS

| | | |
|---|---|---|
| EP | 2 857 834 A2 | 4/2015 |
| GB | 2494170 A | 3/2013 |
| WO | WO 92/10746 | 6/1992 |
| WO | WO 98/52033 A1 | 11/1998 |
| WO | WO 02/18872 A1 | 3/2002 |

\* cited by examiner

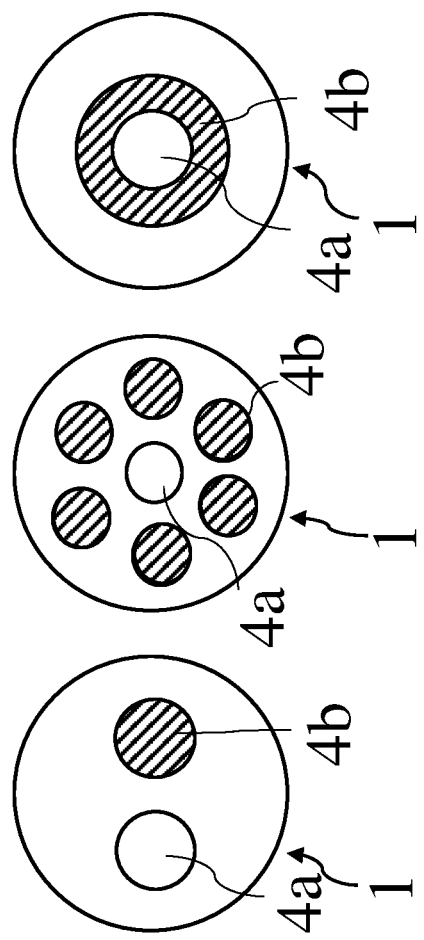

WALL THICKNESS DETECTION OF A MATERIAL LAYER USING ULTRASOUND

TECHNICAL FIELD

The invention relates to an acoustic sensor system for detecting a wall thickness of a material layer.

Moreover, the present invention relates to an inline inspection device comprising the acoustic sensor system.

Further, the present invention relates to a method for detecting a wall thickness of a material layer.

Further, the present invention relates to a computer program comprising instructions which, when the computer program is executed by a computer, cause the computer to carry out steps of the method.

Further, the present invention relates to a data carrier signal which transmits the computer program.

Further, the present invention relates to a computer-readable medium comprising instructions which, when executed by a computer, cause the computer to carry out steps of the method.

BACKGROUND OF THE INVENTION

To date, methods are known in which a wall thickness detection is carried out using high-frequency ultrasound in a range of 4 to 5 MHz. In measurements with high-frequency ultrasound, smallest deviations from a surface normal of an ultrasound beam incident on a wall surface already influence measurement results of a wall thickness.

DESCRIPTION OF THE INVENTION

Based on this situation, it is an object of the present invention to provide an improved sensor system for wall thickness detection of a material layer of a pipeline wall, an improved inline inspection device, an improved method for wall thickness detection of the material layer, an improved computer program, an improved data carrier signal, and an improved computer-readable medium.

In particular, the detection of the wall thickness shall be simplified, and a detection of wall thicknesses for different material layers of a pipeline wall shall be possible, while at the same time the sensitivity shall remain at least the same as for a detection of the wall thickness by means of high-frequent ultrasound.

The object of the invention is achieved by the features of the independent claims. Advantageous embodiments are provided in the dependent claims. Where technically possible, the teachings of the dependent claims may be combined arbitrarily with the teachings of the independent claims and the dependent claims.

According to the invention, an acoustic sensor system for determining a wall thickness of a material layer of a pipeline wall is provided. The sensor system comprises at least one transmitter unit configured to emit ultrasound toward a material layer and to detect an ultrasound echo reflected from the material layer. The at least one transmitter unit is configured to emit ultrasound with a wavelength lambda ($\lambda$) which satisfies the following condition:

$$\lambda \gg |Dl - Dk|.$$

Here, Dl is an acoustic path of an ultrasonic beam which emerges from a portion of the beam exit surface of the transmitter unit remote from the pipeline wall, and Dk is an acoustic path of an ultrasonic beam which emerges from a portion of the beam exit surface of the transmitter unit nearest to the pipeline wall. In other words, in the case the acoustic paths of the ultrasonic beam have different lengths, for example, due to an inclination of the ultrasonic beam exit surface of the sensor system with respect to the pipeline wall, the wavelength lambda of the emitted ultrasonic beam must be substantially larger than an absolute value of a difference between the longer acoustic path and the shorter acoustic path. Furthermore, the acoustic sensor system comprises a control unit signally connected to the at least one transmitter unit and configured to determine a wall thickness of the material layer based on the ultrasonic echo.

According to the invention, further an inline inspection device (ILI) for inspecting a pipeline wall is provided, which comprises at least one acoustic sensor system according to the invention or according to any one of the advantageous embodiments described below.

According to the invention, moreover, a method for detecting a wall thickness of a material layer of a pipeline wall is provided. The method comprises the following steps: operating at least one transmitter unit to emit ultrasound toward a material layer and to detect an ultrasound echo reflected from the material layer. The at least one transmitter unit is here operated to emit ultrasound with a wavelength lambda ($\lambda$) satisfying the following condition:

$$\lambda \gg |Dl - Dk|.$$

Here, Dl is an acoustic path of an ultrasonic beam which emerges from a portion of the beam exit surface of the transmitter unit remote from the pipeline wall, and Dk is an acoustic path of an ultrasonic beam which emerges from a portion of the beam exit surface of the transmitter unit closest to the pipeline wall. Further, the method comprises operating a control unit signally connected to the at least one transmitter unit. The control unit is operated to determine a wall thickness of the material layer based on the ultrasonic echo. The method preferably comprises steps corresponding to features of the sensor system according to any one of the advantageous embodiments described below.

In particular, Dl corresponds to an acoustic path of an ultrasonic beam which emerges from a portion of the beam exit surface of the transmitter unit remote from the pipeline wall and is incident obliquely to a surface normal of a closest surface of the material layer. Alternatively or additionally, Dk corresponds to an acoustic path of an ultrasonic beam which emerges from a portion of the beam exit surface of the transmitter unit closest to the pipeline wall and is incident obliquely to the surface normal of the closest surface of the material layer.

It is preferred that the sequence of process steps can be varied, unless technically required in a specific order. However, the aforementioned sequence of process steps is particularly preferred.

According to the invention, moreover a computer program comprising instructions is provided, which, when the computer program is executed by a computer, cause the computer to execute a previously described method. A computer program is a collection of instructions for executing a particular task, designed to solve a particular class of problems. The instructions of a program are designed to be executed by a computer, wherein it is necessary that a computer is able to carry out programs in order to function.

According to the invention, moreover a data carrier signal is provided, which subsequently transmits the computer program described above.

According to the invention, moreover, a computer-readable medium comprising instructions is provided, which, when executed by a computer, cause the computer to carry out a previously described method.

Hereinafter, the basic idea of the invention and individual aspects of the claimed subject matter of the invention are explained, and preferred modified embodiments of the invention are described further below. Explanations, in particular concerning advantages and definitions of features, are basically descriptive and preferred, but not limiting examples. Where an explanation is limiting, this is expressly mentioned.

The basic idea of the present invention is to use at least one transmitter unit for detecting a wall thickness of a material layer of a pipeline wall. The pipeline wall is formed of at least one material layer. The frequency of the ultrasound is selected in such a way that alignment inaccuracies of the transmitter unit with respect to the surface of the pipeline wall are less significant in signal detection. It has proved particularly advantageous to specify the wavelength on the basis of the acoustic paths of ultrasonic beams deviating from the surface normal. The surface normal corresponds to an imaginary straight line projecting perpendicularly from the surface of the material layer, wherein the straight line projects from the point on the surface of the material layer at which an ultrasonic beam is incident on the surface. In particular, the sensor system according to the invention enables a reliable detection of the wall thickness with alignment tolerances of up to five degrees with respect to the surface normal at the point to which an ultrasonic beam with the area of greatest intensity of a beam belt of the ultrasonic beam is directed. To determine a wall thickness, the transmitter unit excites the material layer of the pipeline to be examined with its resonance frequency by emitting ultrasound in the direction of the material layer. The material layer oscillating at its resonance frequency emits ultrasonic echoes to the transmitter unit, which in turn are detected by the transmitter unit. A control unit receives a time sequence of a signal of the ultrasonic echo from the transmitter unit. The control unit evaluates the ultrasonic echo signal and determines the wall thickness of the material layer based thereon.

When detecting the wall thickness of the material layer, it is taken into account that the ultrasonic echo signal changes according to a surface profile of the material layer. This may be a surface closest to the transmitter unit, e.g. at an inner layer of the pipeline, or a surface disposed on the outer surface of the pipeline wall, i.e. a surface forming an outer layer of the pipeline.

According to a modified embodiment of the invention, it is provided that the pipeline wall comprises at least two material layers, wherein the at least one transmitter unit is configured to excite each of the material layers separately with its respective resonance frequency when emitting ultrasound. Thus, multilayer pipelines can also be inspected with advantage. It is also possible to detect the wall thickness of dirty pipelines which, for example, have dirt deposits on their inner wall. In particular, at least one of the material layers is non-metallic, especially made of plastic or cement.

According to a modified embodiment of the invention, it is provided that at least one transmitter unit is designed for transmitting and detecting low-frequency ultrasound, wherein a frequency of the ultrasound is in a range from 100 KHz to 1200 KHz. Transmitter units operated at low frequencies advantageously permit robustness of the measurements in the case of inaccurate alignment with respect to a surface normal of the material layer surface. For example, the transmitter unit is a broadband transmitter with an ultrasonic beam spectrum that can be used to 80% at an emitted central ultrasonic frequency of 600 KHz. Advantageously, a transmitter unit of the modified embodiment enables to inspect material layers of pipeline walls with a wall thickness in a range of 3 mm to 30 mm for their wall thickness. The measurements are advantageously particularly robust with respect to alignment inaccuracies of the sensor system with respect to the pipeline wall.

According to a modified embodiment of the invention, it is provided that the control unit is configured to perform the following method for evaluating a signal of an ultrasonic echo: selecting a temporal signal portion after an inner wall echo of the material layer and a first degree harmonic of the inner wall echo of the material layer, applying a two-fold Fourier transform to the signal portion; and then calculating the wall thickness based on a temporally earliest occurring maximum of a signal amplitude of the signal portion. An inner wall echo is an echo which is reflected from a pipeline surface of a material layer facing the transmitter in the direction of the transmitter. It should be noted here that the material layer emitting the inner wall echo is not restricted exclusively to the material layer closest to the transmitter unit, i.e., forming the inner wall of the pipeline. Compared to the inner wall echo, an outer wall echo would be an echo reflected towards the transmitter from a side of the pipeline facing away from the transmitter and forming the outer surface (outer shell) of the pipeline. By use of the advantageous method, a signal-to-noise ratio can be significantly improved.

According to a modified embodiment of the invention, on the sensor system a single transmitter unit configured to detect reflected ultrasound and a plurality of transmitter units arranged around the single transmitter unit, each configured to transmit ultrasound are provided. The arrangement of the transmitter units with respect to each other is defined with respect to an ultrasound entrance surface or an ultrasound exit surface. Here, the arrangement of the transmitter units is such that the ultrasound exit or entrance surfaces of all transmitter units lie in a common plane. Surprisingly, it has been found that a particularly good sensitivity for smaller cracks can be achieved when using a single, in particular centrally arranged, transmitter unit for detecting the ultrasonic echoes. If the single transmitter unit is arranged centrally, the sensitivity is particularly good. The surrounding transmitter units, which emit ultrasound, thus emit a particularly large amount of energy, which can propagate through the gas in a pipeline and penetrate the pipeline wall, so that particularly good measurement signals can be achieved, too. Furthermore, the effects of misalignments of the sensor system can advantageously be compensated.

According to a modified embodiment of the invention, the sensor system comprises exactly two transmitter units, of which the first transmitter unit is configured to detect reflected ultrasound and the second transmitter unit is configured to emit ultrasound. This is a particularly compact embodiment of the sensor system.

According to a particularly advantageous embodiment of the invention, it is provided that the second transmitter unit is formed by a one-piece ring at its ultrasound exit surface and, preferably concentrically, an ultrasound entrance surface of the first transmitter unit is arranged inside the ring. A one-piece configuration of the ring means in particular a closed one-piece ultrasonic exit surface of the second transmitter unit. Here, it has been found that the effects described for the previous embodiment occur even more pronounced in this particularly advantageous embodiment. According to a further particularly preferred embodiment, the second transmitter unit is arranged concentrically to the first transmitter unit in such a way that the first and the second transmitter unit have a common circle center. In particular, the first transmitter unit is circular in shape. With the above-described embodiments, it is in particular possible to achieve a good signal-to-noise ratio with a deviation of the alignment of a low-frequency ultrasonic beam to the pipeline wall of 2 degrees from a surface normal of a pipeline wall with a wall thickness of more than 30 mm. For thinner wall thicknesses, even greater deviations in the alignment are possible, with still sufficient signal-to-noise ratio.

With the aforementioned transmitter unit designs, no complex structure for an inline inspection device (ILI) is necessary. In case of an installation of the sensor system in an inline inspection device, the single sensor system per circle sector of a cross-sectional area of the pipeline is therefore sufficient to detect the wall thickness. Depending on the number of circle sectors into which the cross-sectional area of the ILI is divided, a corresponding number of sensor systems is selected. However, only one sensor system is required per circle sector, from which defects are detected separately from the other sensor systems. Preferably, the ILI is designed with respectively two times four sensor systems per circle sector, wherein the two sensor systems, i.e. a row arrangement with two sensor systems, are arranged on a virtual circumferential line at the outer circumference of the ILI, and the four sensor systems, i.e. a row arrangement with four sensor systems, are arranged extending along a virtual line along a longitudinal axis of the pipeline wall.

According to a modified embodiment of the invention, the sensor system comprises a plurality of transmitter units, wherein ultrasonic exit and entrance surfaces of the transmitter units are arranged in a circular configuration. A circular configuration means, for example, that the transmitter units are arranged with their respective center of the ultrasonic exit or entrance surfaces on a fictional circle. In this case, a transmitter unit that is only configured for detection can be arranged in the center of a circle. With a circular configuration of exit/entrance surfaces for ultrasound, good signal-to-noise ratios can be achieved with particular advantage for gas-filled pipelines.

According to a particularly modified embodiment of the invention, it is provided that the at least one transmitter unit is configured to be excited via a high-voltage chirp. The high voltage for exciting at least one transmitter unit has a frequency of 200 KHz to 1200 KHz. High voltage corresponds to a voltage in a range of 10 volts to 300 volts. Here it has been found advantageously that particularly good signal-to-noise ratios can be achieved.

BRIEF DESCRIPTION OF THE DRAWINGS

In the following, the invention is explained in more detail with reference to the accompanying drawings on the basis of preferred exemplary embodiments. The term Figure is abbreviated in the drawings as FIG.

In the drawings;

FIG. 2a is a schematic top view of an ultrasonic entrance/exit surface of a sensor system according to an optional embodiment;

FIG. 2b is a schematic top view of an ultrasonic entrance/exit surface of a sensor system according to a further optional embodiment: and FIG. 2c is a schematic top view of an ultrasonic entrance/exit surface of a sensor system according to a further optional embodiment.

DETAILED DESCRIPTION OF THE EXEMPLARY EMBODIMENTS

The described exemplary embodiments are merely examples that can be modified and/or supplemented in a variety of ways within the scope of the claims. Each feature which is described for a particular exemplary embodiment may be used independently or in combination with other features in any other exemplary embodiment. Any feature which is described for an exemplary embodiment of a particular claim category may also be used in a corresponding manner in an exemplary embodiment of another claim category.

Figure 1C:
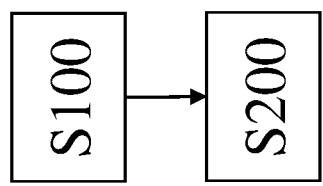
FIG. 1c is a flowchart of a method according to an exemplary embodiment.
Figure 1B:
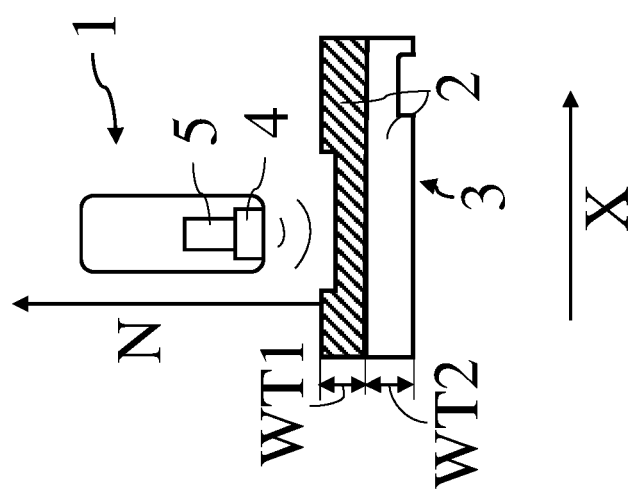
FIG. 1b is a schematic view of a second measuring arrangement comprising a sensor system and a pipeline with a non-metallic outer wall and a metallic inner wall.
Figure 1A:
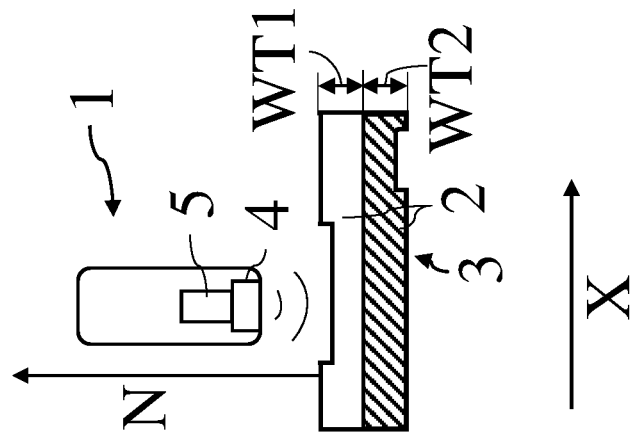
FIG. 1a is a schematic view of a first measuring arrangement comprising a sensor system and a pipeline with a metallic outer wall and a non-metallic inner wall.

FIG. 1a shows a schematic view of a sensor system 1 according to a first embodiment. The sensor system 1 is suitable for detecting a wall thickness WT1, WT2 of a material layer 2 of a pipeline wall 3. In the present exemplary embodiment, the pipeline wall 3 has two material layers 2, of which a first material layer 2 closest to the sensor system 1 is formed of a non-metallic material and a material layer 2 (shown hatched) remote from the sensor system 1 is formed of a metallic material, such as steel.

The non-metallic material layer 2 may be formed from deposits in the pipeline wall 3, which consists of the metallic material layer 2. Alternatively, the non-metallic material layer 2 is formed from an internal coating or internal lining, such as wax. Alternatively, the non-metallic material layer 2 is formed of polyurethane or another plastic.

The material layers 2 have varying wall thicknesses WT1, WT2 along a longitudinal axis X of the pipeline wall 3. The wall thicknesses WT1, WT2 are in a range from 6 mm to 30 mm. Wall thicknesses of greater than 30 mm are also conceivable.

The sensor system 1 comprises a transmitter unit 4 and a control unit 5. The transmitter unit 4 and the control unit 5 are integrated in a common physical unit of the sensor system 1. The transmitter unit 4 is configured to emit ultrasound and receive ultrasound, which is generated in the form of ultrasonic echoes from the respective material layer 2 of the pipeline wall 3. For determining the wall thickness WT1, WT2 of the respective material layer 2, the transmitter unit 4 excites the respective material layer 2 with its resonance frequency and detects the ultrasonic echoes generated at the excited material layer 2.

The transmitter unit 4 is configured to emit and detect low-frequency ultrasound. Here, the transmitter unit 4 emits low-frequency ultrasound with a frequency in a range of 500 to 600 KHz. To emit ultrasound, the transmitter unit 4 is excited with a high voltage chirp in a range of 200 KHz to 1000 KHz.

The transmitter unit 4 is operated under various conditions prevailing in the pipeline. For example, gas with a pressure of at least $5 \times 10^6$ Pa may be present in the pipeline. Alternatively, the pipeline may be carry a fluid such as oil or water.

FIG. 1b shows a schematic view of a sensor system 1 according to the first embodiment, wherein the sensor system 1 inspects a pipeline wall 3 of a different construction than the pipeline wall 3 of FIG. 1a. In the present exemplary embodiment, the pipeline wall 3 comprises two material layers 2, of which a first material layer 2 closest to the sensor system 1 (shown hatched) is formed from a metallic material and a material layer 2 remote from the sensor system 1 is formed from a non-metallic material. The sensor system 1 is configured in the same way as in the embodiment according to FIG. 1a.

The non-metallic material layer 2 may consist of the materials of the non-metallic material layer 2 of the exemplary embodiment according to FIG. 1a. Alternatively, the non-metallic material layer 2 can consist of cement or of fiber-reinforced plastic, e.g. glass fiber-reinforced plastic. Duroplastic plastics, e.g. polyester resin or epoxy resin, or thermoplastics, e.g. polyamide, can be used as the base plastic for the glass fiber-reinforced plastic.

According to an embodiment not shown, the sensor system 1 is designed for detecting wall thicknesses WI of the material layers 2 of a pipeline wall 3, which is formed from two non-metallic material layers 2. The two non-metallic material layers 2 may consist of the materials described previously with reference to FIGS. 1a and 1b. In particular, an outer layer, i.e. the material layer 2 remote from the sensor system 1, is formed of cement, and an inner layer, i.e. the material layer 2 closest to the sensor system 1, is formed of polyurethane.

The transmitter unit 4 of the embodiments described above and below is a piezoelectric broadband transmitter. The sensor system 1 may be configured according to any of the exemplary embodiments of FIGS. 2a to 2c. FIGS. 2a to 2c each show a schematic top view of an ultrasonic entrance/exit surface of a sensor system 1 according to optional embodiments. In these exemplary embodiments, ultrasound emitting and ultrasound detecting transmitter units 4a, 4b are integrated in one physical unit.

According to the embodiment shown in FIG. 2a, the sensor system 1 comprises an emitting transmitter unit 4b and a detecting transmitter unit 4a.

According to the exemplary embodiment of FIG. 2b, the sensor system 1 comprises a plurality of ultrasound emitting transmitter units 4b and an ultrasound echoes detecting transmitters unit 4a arranged in the center of the ultrasound emitting transmitter units 4b.

According to an exemplary embodiment of FIG. 2c, the sensor system 1 comprises a detecting transmitter unit 4a and an emitting transmitter unit 4b annularly surrounding the detecting transmitter unit 4a. In other words, the second transmitter unit 4b is formed by a one-piece ring at its ultrasonic exit surface, and an ultrasonic exit surface of the first transmitter unit 4a is arranged inside the ring.

Alternatively or additionally, the sensor systems 1 according to the exemplary embodiment of FIG. 2a or 2c are installed in a formation as shown in FIG. 2b with their ultrasonic exit or ultrasonic entrance surfaces arranged relative to each other (circularly) on an outer circumference of an inline inspection device (ILI). The number of detecting transmitter units 4a arranged in the center and/or emitting transmitter units 4b arranged in the circle is adjustable as required by a signal-to-noise ratio to be achieved, the characteristics of the pipeline, and a size of the sensor system 1. The emitting transmitter units 4b may also be arranged in a plurality of circles of different diameters around the detecting transmitter unit(s) 4a. Alternatively to the above exemplary embodiments, the detecting transmitter units 4a are arranged in circles around one or more ultrasound emitting transmitter unit(s) 4b. This may be realized in one physical unit or in multiple physical units according to the principles described above.

The transmitter unit(s) 4 is/are controlled to operate a pitch catch mode (PC mode). The PC mode is also abbreviated as "PC" in the following. In the PC mode, a part of the transmitter unit 4 (for example, a part as previously described with respect to the embodiments according to FIGS. 2a to 2c) emits ultrasound in the direction of the pipeline wall 3 and detects ultrasonic echoes reflected from the pipeline wall 3 via another part of the transmitter unit 4 (for example, a part as previously described with respect to FIGS. 2a to 2c) that is structurally separated from the ultrasound emitting part.

To determine the wall thickness WT1, WT2 of a material layer 2 of the pipeline wall 3, for example, the following method, shown schematically in FIG. 1c, can be used: First, according to step "S100", the transmitter unit 4 is operated to emit ultrasound in the direction of the material layer 2 to be examined and to detect an ultrasonic echo reflected from the material layer 2. The transmitter unit 4 is operated to emit ultrasound with a wavelength λ satisfying the following condition:

$$\lambda \gg |Dl-Dk|.$$

Here, Dl is an acoustic path of an ultrasonic beam emerging from a portion of the beam exit surface of the transmitter unit 4 remote from the pipeline wall 3, and Dk is an acoustic path of an ultrasonic beam emerging from a portion of the beam exit surface of the transmitter unit 4 closest to the pipeline wall 3. In the present case, the ultrasonic beam is incident with the acoustic path Dl oblique to a surface normal N of the pipeline wall 3. With regard to the surface normal N, reference is made to FIGS. 1a and 1b, in which a surface normal N is drawn. Dk is an acoustic path of an ultrasonic beam which is incident deviating from the surface normal N of the surface of the material layer 2 closest to the sensor system 1, i.e. oblique thereto. The acoustic paths of the ultrasonic beams can extend oblique, for example, if the beam exit surface of the sensor system 1 is inclined with respect to the pipeline wall 3 (not shown).

The surface normal N is indicated in FIGS. 1a and 1b for the first material layer 2 for illustrative purposes. It is always the surface normal N of that material layer 2 which is currently being inspected for its wall thickness WT by the sensor system 1. Here, a normal vector corresponding to the surface normal N points in the direction of the sensor system 1.

According to a step "S200", a control unit 5 signally connected to the at least one transmitter unit 4 is operated in order to detect a wall thickness WT of the material layer 2 on the basis of the ultrasonic echo, which can be, for example, the wall thickness WT1 or the wall thickness WT2.

The control unit 5 receives a signal from the transmitter unit 4, the strength of which varies over time. To detect the wall thickness WT, the control unit 5 selects a temporal signal sequence after an inner wall echo of the material layer 2 and a first degree harmonic of the inner wall echo of the material layer 2. The control unit 5 applies a two-fold Fourier transform to this signal sequence. Subsequently, the control unit 5 determines the wall thickness WT on the basis of a temporally earliest occurring maximum of a signal amplitude of the signal portion.

Here, a wall thickness WT is determined based on a period T1, T2, . . . , Ti of the inner wall echo timing. The wall thickness WT is then obtained, for example, taking into account a period T1 of the maximum amplitude of the inner wall echo signal:

$$WT = \frac{CT1}{2}$$

Here C is the acoustic velocity of the ultrasound in the material layer 2 of the pipeline wall 3 to be examined.

LIST OF REFERENCE SYMBOLS 1 sensor system
2 material layer
3 pipeline wall
4 transmitter unit
4a, 4b emitting/detecting transmitter unit
5 control unit
C velocity of ultrasound in the material layer
N surface normal
X longitudinal axis of the pipeline wall
Dl longer acoustic path
Dk shorter acoustic path
WT wall thickness
WT1 wall thickness of the material layer closest to the sensor system
T2 wall thickness of the material layer remote from the sensor system
S100 operating at least one transmitter unit to emit ultrasound toward a material layer and to detect an ultrasound echo reflected from the material layer,
S200 operating a control unit, which is signally connected to the at least one transmitter unit, in order to determine a wall thickness of the material layer based on the ultrasonic echo
T1, Ti period duration
λ (lambda); parameter for wavelength

The invention claimed is:

1. A method for determining a wall thickness (WT) of a material layer (2) of a pipeline wall (3) by means of an acoustic sensor system (1), with alignment tolerances of up to five degrees with respect to a surface normal (N) at a point to which an ultrasonic beam with the area of greatest intensity of a beam belt of the ultrasonic beam is directed, wherein the method comprises the steps of:
   operating (S100) at least one transmitter unit (4) in order to emit ultrasound toward the material layer (2) and to detect an ultrasound echo reflected from the material layer (2),
   wherein the at least one transmitter unit (4) emits ultrasound with a wavelength (λ) satisfying the following condition:

$\lambda >> |Dl-Dk|$, where Dl is an acoustic path of an ultrasonic beam emerging from a portion of the beam exit surface of the transmitter unit (4) remote from the pipeline wall (3), and Dk is an acoustic path of an ultrasonic beam emerging from a portion of the beam exit surface of the transmitter unit (4) closest to the pipeline wall (3); and
   operating (S200) a control unit (5) signally connected to the at least one transmitter unit (4) in order to determine a wall thickness (WT) of the material layer (2) based on the ultrasonic echo.

2. The method according to claim 1, wherein the pipeline wall (3) comprises at least two material layers (2), wherein the at least one transmitter unit (4) is operated to excite each of the material layers (2) separately with its respective resonance frequency when emitting ultrasound.

3. The method according to claim 1, wherein the at least one transmitter unit (4) is designed for emitting and detecting low-frequency ultrasound, wherein a frequency of the ultrasound is in a range from 100 KHz to 1200 KHz.

4. The method according to claim 1, wherein the control unit (5) carries out the following method for evaluating a signal of an ultrasonic echo:
   selecting a temporal signal sequence after an inner wall echo of the material layer (2) and a first degree harmonic of the inner wall echo of the material layer (2),
   applying a two-fold Fourier transform to the signal sequence; and then calculating the wall thickness (WT) based on a temporally earliest occurring maximum of a signal amplitude of the signal sequence.

5. The method according to claim 1, wherein the acoustic sensor system (1) comprises:
   a single transmitter unit (4) configured to detect reflected ultrasound; and
   a plurality of transmitter units (4) arranged around the single transmitter unit (4), each configured to transmit ultrasound.

6. The method according to claim 1, wherein the acoustic sensor system (1) comprises exactly two transmitter units (4), of which
   the first transmitter unit (4) is configured to detect reflected ultrasound, and
   the second transmitter unit (4) is configured to transmit ultrasound.

7. The method according to claim 6, wherein the second transmitter unit (4) is formed by a one-piece ring at its ultrasound exit surface and an ultrasound entrance surface of the first transmitter unit (4) is arranged, preferably concentrically, inside the ring.

8. The method according to claim 1, wherein the acoustic sensor system (1) comprises a plurality of transmitter units (4), wherein ultrasound exit and entrance surfaces of the transmitter units (4) are arranged circularly.

9. The method for determining a wall thickness (WT) of a material layer (2) of a pipeline wall according to claim 1, further comprising the step of transmitting a computer program with a data carrier signal.

* * * * *